US 7,781,538 B2

Aug. 24, 2010

(12) United States Patent
Glöckner et al.

(10) Patent No.: US 7,781,538 B2
(45) Date of Patent: Aug. 24, 2010

(54) TIN-FREE, HIGH-MELTING REACTION PRODUCTS OF CARBONYL-HYDROGENATED KETONE ALDEHYDE RESINS, HYDROGENATED KETONE RESINS, AND CARBONYL-HYDROGENATED AND CORE-HYDROGENATED KETONE ALDEHYDE RESINS BASED ON AROMATIC KETONES AND POLYISOCYNATES

(75) Inventors: Patrick Glöckner, Haltern am See (DE); Andreas Wenning, Nottuln (DE); Peter Denkinger, Nottuln (DE); Michael Ewald, Marl (DE)

(73) Assignee: Evonik Degussa GmbH, Essen (DE)

( * ) Notice: Subject to any disclaimer, the term of this patent is extended or adjusted under 35 U.S.C. 154(b) by 393 days.

(21) Appl. No.: 11/573,212

(22) PCT Filed: Jun. 21, 2005

(86) PCT No.: PCT/EP2005/052872

§ 371 (c)(1),
(2), (4) Date: Jun. 14, 2007

(87) PCT Pub. No.: WO2006/018341

PCT Pub. Date: Feb. 23, 2006

(65) Prior Publication Data

US 2008/0045669 A1 Feb. 21, 2008

(30) Foreign Application Priority Data

Aug. 12, 2004 (DE) ........................ 10 2004 039 083

(51) Int. Cl.
*C08L 75/04* (2006.01)
*C08G 18/00* (2006.01)

(52) U.S. Cl. ..................... 525/399; 525/398; 525/157; 528/85; 528/125; 528/129; 528/127; 528/256; 528/230; 528/228; 528/259; 528/261

(58) Field of Classification Search .................. 528/227, 528/44, 125, 129, 164, 256, 230, 127, 228, 528/259, 261; 524/196; 525/440, 457, 458, 525/157, 398, 399

See application file for complete search history.

(56) References Cited

U.S. PATENT DOCUMENTS

| | | | | |
|---|---|---|---|---|
| 4,585,819 | A * | 4/1986 | Reischle et al. | 524/196 |
| 4,731,434 | A | 3/1988 | Doerffel | |
| 5,919,859 | A * | 7/1999 | Ortelt et al. | 524/591 |
| 6,452,003 | B1 | 9/2002 | Ewald et al. | |
| 6,552,154 | B1 | 4/2003 | Kohlstruk et al. | |
| 6,613,863 | B2 | 9/2003 | Kohlstruk et al. | |
| 6,730,628 | B2 | 5/2004 | Kohlstruk et al. | |
| 6,794,482 | B2 | 9/2004 | Gloeckner et al. | |
| 6,797,787 | B2 | 9/2004 | Scholz et al. | |
| 6,800,714 | B2 | 10/2004 | Kohlstruk et al. | |
| 6,881,785 | B2 | 4/2005 | Glockner et al. | |
| 7,001,973 | B2 | 2/2006 | Kohlstruk et al. | |
| 7,005,002 | B2 | 2/2006 | Glockner et al. | |
| 7,033,522 | B2 | 4/2006 | Jonderko et al. | |
| 7,101,958 | B2 | 9/2006 | Gloeckner et al. | |
| 7,135,522 | B2 | 11/2006 | Gloeckner et al. | |
| 7,138,465 | B2 | 11/2006 | Gloeckner et al. | |
| 7,144,975 | B2 | 12/2006 | Gloeckner et al. | |
| 7,183,372 | B2 | 2/2007 | Andrejewski et al. | |
| 7,199,166 | B2 | 4/2007 | Gloeckner et al. | |
| 2004/0122172 | A1 | 6/2004 | Glockner et al. | |
| 2005/0010016 | A1 | 1/2005 | Glockner et al. | |
| 2005/0043499 | A1 * | 2/2005 | Gloeckner et al. | 528/129 |
| 2005/0043501 | A1 | 2/2005 | Glockner et al. | |
| 2005/0124716 | A1 * | 6/2005 | Gloeckner et al. | 522/113 |
| 2005/0148686 | A1 * | 7/2005 | Eugene et al. | 523/160 |
| 2006/0074217 | A1 | 4/2006 | Gloeckner et al. | |

FOREIGN PATENT DOCUMENTS

EP 1 361 236 11/2003
EP 1 508 582 2/2005

OTHER PUBLICATIONS

U.S. Appl. No. 10/586,587, filed Jul. 20, 2006, Gloeckner, et al.
U.S. Appl. No. 10/588,193, filed Aug. 2, 2006, Gloeckner, et al.
U.S. Appl. No. 11/587,792, filed Oct. 27, 2006, Gloeckner, et al.
U.S. Appl. No. 11/631,392, filed Dec. 29, 2006, Gloeckner, et al.
U.S. Appl. No. 11/632,303, filed Jan. 12, 2007, Andrejewski, et al.
U.S. Appl. No. 11/574,113, filed Feb. 22, 2007, Gloeckner, et al.
U.S. Appl. No. 11/574,197, filed Feb. 23, 2007, Gloeckner, et al.
U.S. Appl. No. 11/577,415, filed Apr. 18, 2007, Gloeckner, et al.
U.S. Appl. No. 12/158,800, filed Jun. 23, 2008, Gloeckner, et al.
U.S. Appl. No. 12/159,097, filed Jun. 25, 2008, Gloeckner, et al.
U.S. Appl. No. 12/159,673, filed Jun. 30, 2008, Gloeckner, et al.
U.S. Appl. No. 12/159,906, filed Jul. 2, 2008, Gloeckner, et al.
U.S. Appl. No. 11/577,955, filed Apr. 25, 2007, Gloeckner, et al.
U.S. Appl. No. 11/814,306, filed Jul. 19, 2007, Gloeckner, et al.
U.S. Appl. No. 11/577,139, filed Apr. 12, 2007, Gloeckner, et al.
U.S. Appl. No. 11/917,104, filed Dec. 10, 2007, Vey, et al.
U.S. Appl. No. 11/909,098, filed Sep, 19, 2007, Spyrou, et al.
U.S. Appl. No. 11/911,394, filed Oct. 12, 2007, Becker, et al.
U.S. Appl. No. 12/301,619, filed Nov. 20, 2008, Gloeckner, et al.
U.S. Appl. No. 12/303,121, filed Dec. 2, 2008, Gloeckner, et al.

* cited by examiner

*Primary Examiner*—Milton I Cano
*Assistant Examiner*—Michael Leonard
(74) *Attorney, Agent, or Firm*—Oblon, Spivak, McClelland, Maier & Neustadt, L.L.P.

(57) ABSTRACT

The invention relates to tin-free reaction products of hydroxyl-containing hydrogenated ketone resins, carbonyl-hydrogenated ketone-aldehyde resins, and carbonyl-hydrogenated and ring-hydrogenated ketone-aldehyde resins based on aromatic ketones and polyisocyanates, to a process for their preparation and to the use thereof, in particular as a main component, base component or additive component in coating materials, adhesives, inks, polishes, glazes, stains, pigment pastes, filling compounds, cosmetics articles, sealants and/or insulants.

38 Claims, No Drawings

TIN-FREE, HIGH-MELTING REACTION PRODUCTS OF CARBONYL-HYDROGENATED KETONE ALDEHYDE RESINS, HYDROGENATED KETONE RESINS, AND CARBONYL-HYDROGENATED AND CORE-HYDROGENATED KETONE ALDEHYDE RESINS BASED ON AROMATIC KETONES AND POLYISOCYNATES

The invention relates to tin-free reaction products of hydroxyl-containing, carbonyl-hydrogenated ketone and ketone-aldehyde resins and also hydrogenated ketone-aldehyde resins based on aromatic ketones and polyisocyanates, to a process for preparing them and to their use, particularly in coating materials and adhesives.

Ketone-aldehyde resins are used in coating materials as, for example, a film-forming additive component in order to enhance certain properties such as initial drying rate, gloss, hardness or scratch resistance. Normally ketone-aldehyde resins possess hydroxyl groups and can therefore be crosslinked using, for example, polyisocyanates or amine resins. In physically or oxidatively drying coating or adhesive systems, in contrast, there is no buildup of polymer through crosslinking of these resins. Owing to the uncrosslinked and hence relatively low molecular mass fractions, therefore, coatings of this kind often possess a low resistance toward, for example, gasoline, chemicals or solvents.

The abovementioned disadvantages can be mitigated by increasing the molecular weight of the ketone-aldehyde resins. As a result of the increase in molecular weight there is a significant rise in the melting range and/or softening range, which, although beneficial to the initial drying rate and the aforementioned resistance properties of coating materials or adhesives, may impact negatively on the preparation of high-quality products, as for example in respect of the color number of the resins. In addition to this the favorable solubility properties and theological properties of the resins are adversely affected.

Moreover, as a result of irradiation, for example, the carbonyl groups are subject to classic degradation reactions such as those of Norrish type I or II (Laue, Plagens, Namen-und Schlagwort-Reaktionen der Organischen Chemie [Name and Keyword Reactions], Teubner Studienbücher, Stuttgart, 1995).

The use of non-modified ketone-aldehyde resins or ketone resins is therefore out of the question for high-quality applications in, for example, the exterior sector, where a high level of resistance properties, particularly with respect to weathering and heat, is required. Similarly unsatisfactory weathering properties are possessed by phenolic resins of the novolak type or natural resins.

The conversion of the carbonyl groups into secondary alcohols by hydrogenation ketone-aldehyde resins has long been practiced (DE 8 70 022, DE 32 41 735, JP 11012338). One typical and known product is Kunstharz SK from Degossa AG. The use of carbonyl- and ring-hydrogenated ketone-aldehyde resins based on ketones containing aromatic groups is likewise possible. A resin of this kind is described in DE 33 34 631. The OH number of such products, at more than 200 mg KOH/g, is very high.

The reaction between isocyanate groups and hydroxyl groups is normally accelerated using catalysts. Because of numerous advantages, such as reaction kinetics or catalyst system stability even on prolonged heat exposure, for example, organotin compounds, such as dibutyltin dilaurate, for example, have become established. The industry, however, is being urged to replace these catalysts on environmental and toxicological grounds.

WO 03/091307 (EP 1 361 236) describes the preparation and use of polyurethane resins which are the reaction product of at least one diisocyanate and a group of components containing isocyanate-reactive groups, said group being composed of
  a) a 1st group of one or more polyetherpolyols
  b) a 2nd group of one or more polyhydroxylated resins, selected from the group consisting of hard ketonic resins, polyester resins, acrylic-styrene copolymers, polyacrylates, rosin derivatives and terpene-phenolic resins,
  c) optionally a 3rd group of one or more polyols having a molecular weight≦800 g/mol, and
  d) at least one amine and a reaction terminator, the ratio of the equivalent weights of the diisocyanate components and of the components which possess isocyanate-reactive groups being chosen such that substantially all of the isocyanate groups of the diisocyanates are present in the form of reaction product with one of the stated isocyanate-reactive functional groups.

The reaction products on which the present invention is based contain no polyethers, amines and no chain terminators. The reaction regime as well is different. Accordingly the products obtained there are not comparable with the products of the present invention. Since, obviously, dibutyltin dilaluate is used as catalyst, an environmental and toxicological risk can be assumed as well.

EP 1 229 090 describes similar polymers to those of WO 03/091307, and so the same arguments apply. Additionally that publication does not use carbonyl-hydrogenated ketone-aldehyde resin and/or carbonyl-hydrogenated ketone resin and/or carbonyl-hydrogenated and ring-hydrogenated ketone-aldehyde resin based on aromatic ketones.

EP 107 097 describes hotmelt adhesives composed of a mixture comprising prepolymeric isocyanate, a thermoplastic polymers and a low molecular weight synthetic resin, characterized in that the mixture comprises the following components:
  a) 20% to 90% by weight of prepolymeric isocyanate
  b) 0% to 75% by weight of a thermoplastic polyurethane
  c) 0% to 50% of a low molecular weight synthetic resin from the group of the ketone resins and/or ketone-aldehyde condensation resins and/or hydrogenation products of acetophenone condensation resins.

In contrast to the products used in EP 107 097 the present invention does not use any thermoplastic polyurethane. Moreover, it uses hydrogenated resins, especially carbonyl-hydrogenated ketone-aldehyde resins and/or carbonyl-hydrogenated ketone resins and/or carbonyl-hydrogenated and ring-hydrogenated ketone-aldehyde resins based on aromatic ketones. Hydrogenated aldol homocondensates of acetophenone as described in EP 107 097 are explicitly not claimed.

DE 34 16 378 describes release coating mixtures using nonhydrogenated ketone-aldehyde resins, especially cyclohexanone-formaldehyde resins, as their main component.

High-melting resins based on hydrogenated ketone-aldehyde resins and diisocyanates and/or polyisocyanates for radiation-curing coating materials are described in DE 102004 020 740. Besides the fact that, therein, radiation-reactive solvents are used, which restrict the scope for use and prohibit use in non-radiation-curing applications, catalysts are used which contain tin, as well.

It was an object of the present invention to find tin-free reaction products, stable to hydrolysis, which improve the initial drying rate, hardness, gloss, solvent resistance, chemical resistance, and adhesion of coating systems and adhesives. The products ought to possess good thermal stability and weathering stability. Additionally the preparation ought to be able to be carried out within an optimized time frame from the economics standpoint.

Surprisingly it has been possible to achieve this object by using, in coating materials or adhesives, reaction products composed of the products of reaction of hydrogenated ketone resins, carbonyl-hydrogenated ketone-aldehyde resins and/or ring-hydrogenated and carbonyl-hydrogenated ketone-aldehyde resins based on aromatic ketones (aryl alkyl ketones) and diisocyanates or polyisocyanates having a melting range of above 140° C., and being tin-free. Excluded explicitly in this context are homo-aldol-condensation products (ketone resins) of acetophenone.

This reaction, which is normally catalyzed with organotin compounds, has surprisingly been catalyzed by the presence of other, tin-free compounds and, especially when bismuth organyls are used, leads to products of equal quality at similar reaction rates.

The tin-free reaction products of the invention are also stable to hydrolysis and resistant to chemicals and possess a high yellowing resistance. In coating materials or adhesives the reaction products generate high gloss, a good initial drying rate, and adhesion to different substrates such as metals, for example, and plastics such as polyethylene, polypropylene, or olycarbonate, for example, in conjunction with a high level of hardness.

The invention provides tin-free high-melting reaction products essentially comprising the product of reaction, with a melting range of above 140° C., of A) at least one carbonyl-hydrogenated ketone-aldehyde resin and/or hydrogenated ketone resin and/or carbonyl-hydrogenated and ring-hydrogenated ketone-aldehyde resin based on aromatic ketones with B) at least one aromatic, aliphatic and/or cycloaliphatic diisocyanate or polyisocyanate.

Explicitly excluded are homo-aldol-condensation products (ketone resins) of acetophenone.

Also provided by the invention is a reaction product, where mixtures of additional polymers C) and of component A) are subjected to polymer-analogous reaction with component B).

The invention further provides for the use of reaction products essentially comprising the product of reaction, with a melting range of above 140° C., of A) at least one carbonyl-hydrogenated ketone-aldehyde resin and/or hydrogenated ketone resin and/or carbonyl-hydrogenated and ring-hydrogenated ketone-aldehyde resin based on aromatic ketones with B) at least one aromatic, aliphatic and/or cycloaliphatic diisocyanate or polyisocyanate as a main component, base component or additive component in coating materials, adhesives, inks, polishes, glazes, stains, pigment pastes, filling compounds, cosmetics articles, sealants and/or insulants, particularly for the purpose of enhancing initial drying rate, adhesion properties, gloss, solvent resistance, chemical resistance and hardness.

Ketones suitable for preparing the hydrogenated ketone resins and carbonyl-hydrogenated ketone-aldehyde resins (component A)) include all ketones, especially acetone, acetophenone, ring-substituted acetophenone derivatives, such as hydroxy-, methyl-, ethyl-, tert-butyl- and cyclohexyl-acetophenone, 4-tert-butyl methyl ketone, methyl ethyl ketone, heptan-2-one, pentan-3-one, methyl isobtutyl ketone, propiophenone, methyl naphthyl ketone, cyclopentanone, cyclododecanone, mixtures of 2,2,4- and 2,4,4-trimethylcyclopelntanone, cycloheptanone and cyclooctanone, cyclohexanone and all alkyl-substituted cyclohexanones having one or more alkyl radicals, which contain in total from 1 to 8 carbon atoms, individually or in a mixture. Examples that may be mentioned of alkyl-substituted cyclohexanones include 4-tert-amylcyclohexanone, 2-sec-butylcyclohexanone, 2-tert-butylcyclohexanone, 4-tert-butylcyclohexanone, 2-methylcyclohexanone and 3,3,5-tri-methylcyclohexanone.

Generally speaking, however, it is possible to use any of the ketones said in the literature to be suitable for ketone and ketone-aldehyde resins syntheses, generally any C—H-acidic ketones.

Preference is given to hydrogenated ketone resins based on 4-tert-butyl methyl ketone, cyclohexanone, 4-tert-butylcyclohexanone, 3,3,5-trimethylcyclohexanone or heptanone, alone or in a mixture of these ketones, but not based on acetophenone.

Preference is given to carbonyl-hydrogenated ketone-aldehyde resins based on acetophenone, 4-tert-butyl methyl ketone, cyclohexanone, 4-tert-butylcyclohexanone, 3,3,5-trimethyl-cyclohexanone or heptanone, alone or in a mixture of these ketones.

As the aldehyde component of the carbonyl-hydrogenated ketone-aldehyde resins (component A)) suitability is possessed in principle by branched or unbranched aldehydes, such as formaldehyde, acetaldehyde, n-butyraldelhyde and/or isobutyraldehyde, valeraldehyde and also dodecanal, for example. Generally speaking it is possible to use any of the aldehydes said in the literature to be suitable for ketone-aldehyde resin syntheses. Preference, however, is given to using formaldehyde, alone or in mixtures.

The required formaldehyde is normally used in the form of an aqueous or alcoholic (e.g., methanol or butanol) solution with a strength of from about 20% to 40% by weight. Other use forms of the formaldehyde, including for example the use of para-formaldehyde or trioxane, are likewise possible. Aromatic aldehydes, such as benzaldehyde, may likewise be present as a mixture with formaldehyde.

Starting compounds used with particular preference for the carbonyl-hydrogenated ketone-aldehyde resins of component A) include acetophenone, 4-tert-butyl methyl ketone, cyclohexanone, 4-tert-butylcyclohexanone, 3,3,5-trimethyl-cyclohexanone and heptanone, alone or in a mixture, and formaldehyde.

To a minor extent it is possible to use nonhydrogenated ketone-aldehyde resins, which then, however, possess lower light fastness properties.

The resins from ketone or from ketone and aldehyde are hydrogenated with hydrogen at pressures of up to 300 bar in the presence of a catalyst. In the course of this reaction the carbonyl group of the ketone resin or ketone-aldehyde resin is converted into a secondary hydroxyl group. Depending on the reaction conditions some of the hydroxyl groups may be eliminated, to give methylene groups. Further moieties, such as any double bonds present, for example, may likewise be hydrogenated in this way.

This is illustrated by the following schema:

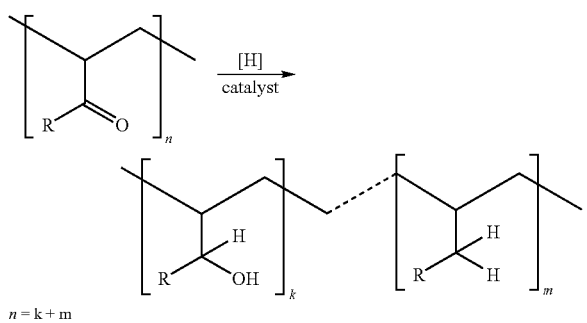

$n = k + m$

Ketones suitable for preparing the carbonyl-hydrogenated and ring-hydrogenated ketone-aldehyde resins (component A)) include any ketones which besides C—H-acidic protons possess aromatic groups, especially alyl alkyl ketones such as methyl naphthyl ketone, acetophenone and/or its derivatives, such as, for example, ring-substituted acetophenone derivatives, such as hydroxy-, methyl-, ethyl-, tert-butyl- and cyclohexyl-acetophenone.

By appropriate choice of the hydrogenating conditions it is also possible to hydrogenate the hydroxyl groups, so that cycloaliphatic rings are formed. The ring-hydrogenated resins possess OH numbers of from 50 to 450 mg KOH/g, preferably from 100 to 350 mg KOH/g, more preferably from 150 to 300 mg KOH/g. The fraction of aromatic groups is below 50%, preferably below 30%, more preferably below 10%, by weight in each case. One process is described in DE 33 34 631.

Suitability as component B) is possessed by aromatic, aliphatic and/or cycloaliphatic diisocyanates and/or polyisocyanates.

Examples of diisocyanates are cyclohexane diisocyanate, methylcyclohexane diisocyanate, ethylcyclohexane diisocyanate, phenylene diisocyanate, propylcyclohexane diisocyanate, methyldiethylcyclohexane diisocyanate, tolylene diisocyanate, bis(isocyanatophenyl)methane, propane diisocyanate, butane diisocyanate, pentane diisocyanate, hexane diisocyanate, such as hexamethylene diisocyanate (HDI) or 1,5-diisocyanato-2-methylpentane (MPDI), heptane diisocyanate, octane diisocyanate, nonane diisocyanate, such as 1,6-diisocyanato-2,4,4-trimethylhexane or 1,6-diisocyanato-2,2,4-trimethylhexane (TMDI), nonane triisocyanate, such as 4-isocyanatomethyl-1,8-octane diisocyanate (TIN), decane diisocyanate and triisocyanate, undecane diisocyanate and triisocyanate, dodecane diisocyanates and triusocyanates, isophorone diisocyanate (IPDI), bis(isocyanatomethylcyclohexyl)methane ($H_{12}$MDI), isocyanatomethyl methylcyclohexyl isocyanate, 2,5(2,6)-bis(isocyanatomethyl)bicyclo[2.2.1]heptane (NBDI), 1,3-bis(isocyanatomethyl) cyclohexane (1,3-$H_6$-XDI) or 1,4-bis(isocyanatomethyl) cyclohexane (1,4-$H_6$-XDI), alone or in a mixture.

Another preferred class of polyisocyanates as component B) are the compounds which have more than two isocyanate groups per molecule and are prepared by dimerization, trimerization, allophanatization, bieuretization and/or urethanization of the simple diisocyanates, examples being the reaction products of these simple diisocyanates, such as IPDI, TMDI, HDI and/or $H_{12}$MDI, for example, with polyhydric alcohols (e.g., glycerol, trimethylolpropane, pentaerythritol) and/or polyfunctional polyamines, or the triisocyanurates, which are obtainable by trimerizing the simple diisocyanates, such as IPDI, HDI and $H_{12}$MDI, for example.

It is also possible to replace some of component A) by other hydroxy-functional polymers C) such as, for example, non-hydrogenated and/or ring-hydrogenated phenyl-aldehyde resins, hydroxy-functional nonhydrogenated ketone-aldehyde resins, hydroxy-functional polyesters and/or polyacrylates. In that case it is possible to subject mixtures of these polymers C) with component A) directly to polymer-analogous reaction with component B). In contradistinction to the "pure" resins of component A) it is possible by this means to adjust certain properties, such as flexibility or hardness, more effectively. The other hydroxy-functional polymers generally possess molecular weights Mn of between 200 and 10000 g/mol, preferably between 300 and 5000 g/mol.

In order to accelerate the reaction for preparing the resins from A) and B) and optionally C) a tin-free catalyst is used. Suitable tin-free compounds are in principle all those which accelerate an OH/NCO reaction.

Catalysts based on the metals bismuth, zirconium, iron or aluminum are particularly suitable, such as carboxylates, chelates and complexes, for example.

The same applies to purely organic catalysts such as tertiary amines, examples being 1,4-diazabicyclo[2.2.2]octane (DABCO), 1,8-diazabicyclo[5.4.0]undec-7-ene (DBU), N,N-dimethylcyclohexylamine (DMCA) or 1,5-diazabicyclo[2.3.0]non-5-ene (DBN).

Surprisingly it has been found that catalysts containing bismuth provide very great acceleration of the reaction without altering other properties, such as theological behavior, for example. After the end of the reaction the catalysts remain in the reaction product and can where appropriate be stabilized in a suitable way. Stabilization by means of monocarboxylic or dicarboxylic acids has proven particularly effective. It is also possible, though, to use any of the compounds said in the literature to be suitable for stabilizing metals.

The melting range of the product of the tin-free preparation reaction of A) and B) and optionally C) is above 140° C., preferably above 145° C., more preferably above 150° C.

The amounts of A) and B) and, where used, C) are chosen such that 1 mol of the resin (component A)) or 1 mol of the mixture of A) and C), based on $M_n$, and from 0.2 to 15 mol. preferably from 0.25 to 10 mol, in particular from 0.3 to 4 mol of components B) are used.

The preparation of the resins on which the invention is based takes place in the melt or in solution in a suitable organic solvent of component A).

For this Purpose in One Preferred Embodiment I component B) is added in the presence of a suitable catalyst to the solution or melt of component A).

The temperature of the reaction is chosen according to the reactivity of component B). Temperatures which have been found appropriate are those between 30 and 150° C., preferably between 50 and 140° C. The reaction also takes place, though less preferably, at room temperature.

It has proven advantageous to react 1 mol of component A)—based on $M_n$—with from 0.2 to 15 mol, preferably from 0.25 to 10 mol, in particular from 0.3 to 4 mol of the isocyanate component B).

The solvent present where appropriate can, if desired, be separated off after the end of the reaction, in which case the product of the invention is generally a powder.

In One Preferred Embodiment II component B) is added in the presence of a suitable catalyst to the solution or melt of component A) and the hydroxy-functional polymer C), such as nonhydrogenated and/or ring-hydrogenated phenyl-aldehyde resins, hydroxy-functional, nonhydrogenated ketone-aldehyde resins, hydroxy-functional polyesters and/or polyacrylates, for example.

The temperature of the reaction is chosen according to the reactivity of component B). Temperatures which have been found appropriate are those between 30 and 150° C., preferably between 50 and 140° C. The reaction also takes place, though less preferably, at room temperature.

It has proven advantageous to react 1 mol of the sum of components A) and C)—based on $M_n$—with from 0.2 to 15 mol, preferably from 0.25 to 10 mol, in particular from 0.3 to 4 mol of the isocyanate component B).

The solvent present where appropriate can, if desired, be separated off after the end of the reaction, in which case the product of the invention is generally a powder.

The examples which follow are intended to illustrate the invention that has been made, though not to restrict it in its scope of application:

EXAMPLE 1

For the Preparation of a Reaction Product

The synthesis takes place by reacting 400 g of a carbonyl-hydrogenated resin formed from acetophenone and formaldehyde (OHN=240 mg KOH/g (acetic anhydride method), $M_n$~1000 g/mol (GPC against polystyrene standard), melting range 114-120° C.) with 99.3 g of $H_{12}$MDI (Vestanat EP $H_{12}$MDI, Degussa AG) in the presence of 0.15% of Coscat 83 (based on resin, Caschem Catalysts) in 50% dilution with ethyl acetate in a three-necked flask equipped with stirrer, reflux condenser and temperature sensor under nitrogen at 55° C. until an NCO number of less than 0.1 has been reached.

This gives a pale, clear solution having a dynamic viscosity of 2.6 Pa·s. The Gardner color number of the solution is 0.4. After storage at 60° C. for 14 days the Gardner color number is 0.5, which within the bounds of the accuracy of the method can be considered unchanged and suggests high yellowing stability of the resin solution. After the solvent has been separated off a colorless powder is obtained which possesses a melting range of between 163 and 166° C.

| Coating material | A | I |
| --- | --- | --- |
| Nitrocellulose E 510 (65% in isopropanol) | 19.3 | 13.5 |
| Ethyl acetate | 23.2 | 19.5 |
| n-Butanol | 5.0 | 5.0 |
| Methoxypropanol | 2.5 | 2.5 |
| Vestinol AH | 2.5 | 2.5 |
| Resin from example 1 | — | 7.5 |
| Total | 52.5 | 50.5 |

Resin solutions A and I were applied using a doctor blade to a glass plate and also to various plastic plates and metal. The wet film thickness was 100 µm. After 14 days under standard conditions (23° C., 50% relative humidity), the gloss and adhesion of the films were measured.

Film Properties:

| Coating material | FT [µ] | Gloss 60° angle (substrate: pine) |
| --- | --- | --- |
| A | 22-26 | 69 |
| I | 26-33 | 92 |

Blade Scratch Adhesion to Various Substrates:

| Coating material | Glass | ABS | PE | PVC | PC | Metal |
| --- | --- | --- | --- | --- | --- | --- |
| A | 0 | 0 | 10 | 10 | 10 | 2 |
| I | 0 | 0 | 8 | 5 | 2 | 0 |

0 = very good adhesion; 10 = no adhesion

Abbreviations
ABS: Acrylonitrile-butadiene-styrene copolymer
PC: Polycarbonate
PE: Polyethylene
PVC: Polyvinyl chloride
FT: Film thickness

What is claimed is:

1. A tin-free high-melting reaction product comprising the product of reaction, in the presence of a catalyst which contains no tin, with a melting range of above 140° C., of
   A) at least one carbonyl-hydrogenated ketone-aldehyde resin and/or hydrogenated ketone resin and/or carbonyl-hydrogenated and ring-hydrogenated ketone-aldehyde resin based on aromatic ketones
   with
   B) at least one aromatic, aliphatic and/or cycloaliphatic diisocyanate or polyisocyanate.

2. A tin-free high-melting reaction product comprising the product of reaction, in the presence of a catalyst which contains no tin, with a melting range of above 140° C., of
   A) at least one carbonyl-hydrogenated ketone-aldehyde resin and/or hydrogenated ketone resin and/or carbonyl-hydrogenated and ring-hydrogenated ketone-aldehyde resin based on aromatic ketones
   with
   B) at least one aromatic, aliphatic and/or cycloaliphatic diisocyanate or polyisocyanate
   and
   C) at least one further, hydroxy-functionalized polymer.

3. A reaction product as claimed in claim 1, wherein C-H-acetic ketones are used in component A).

4. A reaction product as claimed in claim 1, wherein component A) comprises the carbonyl-hydrogenated ketone-aldehyde resin obtained from one or more ketones selected from
   acetone, acetophenone, ring-substituted acetophenone derivatives, 4-tert-butyl methyl ketone, methyl ethyl ketone, heptan-2-one, pentan-3-one, methyl isobutyl ketone, propiophenone, methyl naphthyl ketone, cyclopentanone, cyclododecanone, mixtures of 2,2,4- and 2,4,4-trimethylcyclopentanone, cycloheptanone and cyclooctanone, cyclohexanone and all alkyl-substituted cyclohexanones having one or more alkyl radicals, which contain in total from 1 to 8 carbon atoms, individually or in a mixture.

5. A reaction product as claimed in claim 1, wherein component A) comprises the carbonyl-hydrogenated ketone-aldehyde resin obtained from one or more alkyl-substituted cyclohexanones having one or more alkyl radicals containing in total from 1 to 8 carbon atoms.

6. A reaction product as claimed in claim 5, wherein 4-tert-amylcyclohexanone, 2-sec-butylcyclohexanone, 2-tert-butylcyclohexanone, 4-tert-butylcyclohexanone, 2-methylcyclohexanone and/or 3,3,5-trimethylcyclohexanone are used.

7. A reaction product as claimed in claim 1, wherein component A) comprises the carbonyl-hydrogenated ketone-aldehyde resin obtained from one or more aldehydes selected from formaldehyde, acetaldehyde, n-butyraldehyde and/or isobutyraldehyde, valeraldehyde or dodecanal.

8. A reaction product as claimed in claim 7, wherein formaldehyde and/or para-formaldehyde and/or trioxane are used.

9. A reaction product as claimed in claim 1, wherein component A) comprises the carbonyl-hydrogenated ketone-aldehyde resin formed from one or more of acetophenone, 4-tert-butyl methyl ketone, cyclohexanone, 4-tert-butylcyclohexanone, 3,3,5-trimethylcyclohexanone or heptanone, and formaldehyde.

10. A reaction product as claimed in claim 1, wherein component A) comprises the hydrogenated ketone resin obtained from one or more ketones selected from acetone, 4-tert-butyl methyl ketone, methyl ethyl ketone, heptan-2-one, pentan-3-one, methyl isobutyl ketone, propiophenone, cyclopentanone, cyclododecanone, mixtures of 2,2,4- and 2,4,4-trimethylcyclopentanone, cycloheptanone and cyclooctanone, cyclohexanone and all alkyl-substituted cyclohexanones having one or more alkyl radicals, which contain in total from 1 to 8 carbon atoms.

11. A reaction product as claimed in claim 10, wherein cyclohexanone, 4-tertamylcyclohexanone, 2-sec-butylcyclohexanone, 2-tert-butylcyclohexanone, 4-tertbutylcyclohexanone, 2-methylcyclohexanone and/or 3,3,5-trimethylcyclohexanone are used.

12. A reaction product as claimed in claim 1, wherein aryl alkyl ketones are used in the carbonyl-hydrogenated and ring-hydrogenated ketone-aldehyde resins of component A).

13. A reaction product as claimed in claim 1, wherein component A) comprises the carbonyl-hydrogenated and ring-hydrogenated ketone-aldehyde resin obtained from a ketone selected from acetophenone, ring-substituted acetophenone derivatives, and methyl naphthyl ketone.

14. A reaction product as claimed in claim 1, wherein component A) comprises the carbonyl-hydrogenated and ring-hydrogenated ketone-aldehyde resin obtained from one or more of formaldehyde, acetaldehyde, n-butyraldehyde and/or isobutyraldehyde, valeraldehyde or dodecanal.

15. A reaction product as claimed in claim 1, wherein the component B) is one or more diisocyanates selected from cyclohexane diisocyanate, methylcyclohexane diisocyanate, ethylcyclohexane diisocyanate, phenylene diisocyanate, propylcyclohexane diisocyanate, methyldiethylcyclohexane diisocyanate, tolylene diisocyanate, bis(isocyanatophenyl)methane, propane diisocyanate, butane diisocyanate, pentane diisocyanate, hexane diisocyanate, heptane diisocyanate, octane diisocyanate, nonane diisocyanate, nonane triisocyanate, decane diisocyanate and triisocyanate, undecane diisocyanate and triisocyanate, dodecane diisocyanates and triisocyanates, isophorone diisocyanate (IPDI), bis(isocyanatomethylcyclohexyl)methane ($H_{12}$MDI), isocyanatomethyl methylcyclohexyl isocyanate, 2,5(2,6)-bis(isocyanatomethyl)bicyclo[2.2.1]heptane (NBDI), 1,3-bis(isocyanatomethyl)cyclohexane (1,3-$H_6$-XDI) or 1,4-bis(isocyanatomethyl)cyclohexane (1,4-$H_6$-XDI).

16. A reaction product as claimed in claim 1, wherein polyisocyanates prepared by dimerization, trimerization, allophanatization, biuretization and/or urethanization of simple diisocyanates are used as component B).

17. A reaction product as claimed in claim 1, wherein isocyanates based on IPDI, TMDI, $H_{12}$MDI and/or HDI are used as component B).

18. A reaction product as claimed in claim 1, wherein 1 mol of component A), based on $M_n$, and from 0.2 to 15 mol, of component B) are used.

19. A reaction product as claimed in claim 1, wherein the melting range of the reaction product of A) and B) is above 140° C.

20. A reaction product as claimed in claim 2, wherein polyesters, polyacrylates, nonhydrogenated ketone-aldehyde resins and/or nonhydrogenated and/or ring-hydrogenated phenyl-aldehyde resins are used as hydroxy-functionalized polymers C).

21. The reaction product as claimed in claim 2, where mixtures of the polymers C) and component A) are subjected to polymer-analogous reaction with component B).

22. A process for preparing a reaction product comprising the product of reaction, with a melting range of above 140° C., of A) at least one carbonyl-hydrogenated ketone-aldehyde resin and/or hydrogenated ketone resin and/or carbonyl-hydrogenated and ring-hydrogenated ketone-aldehyde resin based on aromatic ketones with B) at least one aromatic, aliphatic and/or cycloaliphatic diisocyanate or polyisocyanate and optionally, C) at least one further, hydroxy-functionalized polymer by reacting A) and B) and, where used, C) at temperatures from 20 to 150° C. in the presence of a catalyst which contains no tin.

23. A process as claimed in claim 22, wherein the reactants are

A) at least one carbonyl-hydrogenated ketone-aldehyde resin and/or hydrogenated ketone resin and/or carbonyl-hydrogenated and ring-hydrogenated ketone-aldehyde resin based on aromatic ketones with B) at least one aromatic, aliphatic and/or cycloaliphatic diisocyanate or polyisocyanate and C) at least one further, hydroxy-functionalized polymer.

24. A process as claimed in claim 23, wherein the catalyst is selected from the group consisting of zirconium, iron, bismuth, aluminum and mixtures thereof.

25. A process as claimed in claim 24, wherein compounds comprising bismuth are used as catalyst.

26. A process as claimed in claim 22, wherein the catalyst is stabilized.

27. A process as claimed in claim 26, wherein the catalyst is stabilized with monocarboxylic and/or dicarboxylic acids.

28. A process as claimed in claim 22, wherein the catalyst is an organic compound.

29. A process as claimed in claim 28, wherein the catalyst is a tertiary amine.

30. A process as claimed in claim 29, wherein the catalyst is selected from the group consisting of 1,4-diazabicyclo[2.2.2]octane (DABCO), 1,8-diazabicyclo[5.4.0]undec-7-ene (DBU), N,N-dimethylcyclohexylamine (DMCA),1,5-diazabicyclo[2.3.0]non-5-ene (DBN) and mixtures thereof.

31. A process as claimed in claim 22, wherein component B is added in the presence of the tin-free catalyst to the solution or melt of component A).

32. A process as claimed in claim 22, wherein component B is added in the presence of the tin-free catalyst to the solution or melt of component A) and the hydroxy-functional polymer C).

33. A process as claimed in claim 22, wherein reaction is carried out at temperatures between 30 and 150° C.

34. A coating material, adhesive, ink, polish, glaze, stain, pigment paste, filling compound, cosmetics article, sealant and/or insulant, which comprises the reaction product as claimed in claim 1 as a main component, base component or additive component.

35. A method of improving the adhesion properties and hardness of a coating material, adhesive, ink, polish, glaze, stain, pigment paste, filling compound, cosmetics article, sealant and/or insulant, which comprises incorporating the reaction product as claimed in claim 1 as a main component, base component or additive component therein.

36. A reaction product as claimed in claim 1, which contains no polyethers, amines or chain terminators.

37. A reaction product as claimed in claim 1, which contains no thermoplastic polyurethanes.

38. A process as claimed in claim 22, wherein reaction is carried out at temperatures between 50 and 140° C.

* * * * *